United States Patent
Brack

[15] 3,673,182
[45] June 27, 1972

[54] NAPHTHOLACTAM-(1,8) BASIC DYESTUFFS

[72] Inventor: Alfred Brack, Leverkusen, Germany

[73] Assignee: Farbenfabriken Bayer Aktiengesellschaft, Leverkusen, Germany

[22] Filed: Aug. 26, 1968

[21] Appl. No.: 755,448

[30] Foreign Application Priority Data

Sept. 4, 1967 Germany .......................P 15 69 606.7

[52] U.S. Cl. ...................................260/242, 8/62, 8/162 R, 8/177 R, 8/177 AB, 8/178 R, 8/179, 260/244 R, 260/250 R, 260/251 A, 260/278, 260/286 A, 260/287 R, 260/288 R, 260/289 R, 260/297 Z, 260/304, 260/309.2, 260/325, 260/326.3

[51] Int. Cl. ..............................................C07d 87/50

[58] Field of Search..............260/244 R, 242, 326.5 B, 313.1

[56] References Cited

UNITED STATES PATENTS

| | | | |
|---|---|---|---|
| 3,299,092 | 1/1967 | Brack | 260/326.5 B |
| 3,347,865 | 10/1967 | Brack et al | 260/313.1 |
| 3,362,953 | 1/1968 | Brack | 260/313.1 |

FOREIGN PATENTS OR APPLICATIONS

| | | | |
|---|---|---|---|
| 1,388,597 | 12/1964 | France | 260/326.5 B |
| 730,088 | 5/1955 | Great Britain | 260/326.5 B |

OTHER PUBLICATIONS

Chem. Abst. Vol. 63, column 15021 (1965) QD1.A51

*Primary Examiner*—Natalie Trousof
*Attorney*—Plumley, Tyner & Sandt

[57] ABSTRACT

Basic dyestuffs of the formula

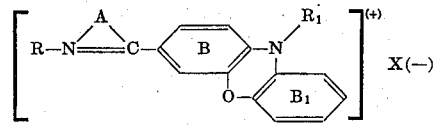

are suitable for the dyeing, printing and bulk dyeing of synthetic and semisynthetic materials especially polyamides, acetate rayon and acid modified polyesters, leather, cocoa fibers, paper and jute, for the production of inks and paste for ball point pens, for use in offset printing, for use in dyeing, printing and bulk dyeing materials which completely or predominately consist of polymerized acrylonitrile and or vinylidene cyanide, the dyeings and prints on the last mentioned materials are characterized by outstanding fastness properties, especially fastness to light, wet processing, cross dyeing, decatizing, sublimation, exhaust fumes and rubbing. The dyestuffs are readily soluble, they yield deep dyeings, due to their high yield and very good drawing power and they do not soil wool. In the formula given above A denotes the residual members of a heterocyclic five or six membered ring to which further rings may be annelated, R is hydrogen, alkyl aralkyl, cycloalkyl or aryl, and R may also be linked to A or to another ring which is annelated to the ring containing A, $R_1$ is hydrogen, alkyl, aralkyl, cycloalkyl or aryl and $R_1$ may also be linked to B or $B_1$, and X is an anion.

12 Claims, No Drawings

NAPHTHOLACTAM-(1,8) BASIC DYESTUFFS

The object of the present invention comprises new basic dyestuffs of the formula (I) and a process for their production, which is characterized in that compounds of the formula (II) are reacted with phenoxazine derivatives of the formula (III) with the use of a condensation agent which yields an anion $X^-$.

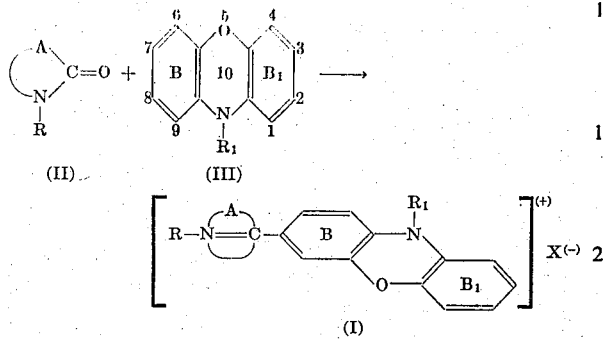

In the formulae (I), (II) and (III), A denotes the residual members of a heterocyclic 5- or 6-membered ring to which further rings may be anellated; R is hydrogen, an alkyl, aralkyl, cycloalkyl or aryl radical, and R may also be linked to A or to another ring which is anellated to a ring containing A; $R_1$ is hydrogen, an alkyl, aralkyl, cycloalkyl or aryl radical, and $R_1$ may also be linked to B or $B_1$; and X is an anion.

The radicals A, R and $R_1$, the rings B and $B_1$ and any rings anellated to the ring containing A may contain non-ionic substituents, but at least one of the two positions 3 and 7 in the rings B and $B_1$ must be unsubstituted. Compounds of the formula (II) which are suitable for carrying out the claimed process are, for example, naphtholactam-(1,8), N-methyl-, N-ethyl-, N-n-propyl-, N-isobutyl-, N-n-amyl-, N-n-hexyl-, N-phenyl-, N-4'-methylphenyl-, N-4'-methoxyphenyl-, N-4'-ethoxyphenyl-, N-benzyl-, N-4'-methylbenzyl-, N-4'-chlorobenzyl-, N-4'-methoxybenzyl-, N-n-phenylethyl-, N-cyclohexyl-, N-methoxycarbonylmethyl-, N-ethoxycarbonylmethyl-, N-β-chloroethyl-, N-β-bromoethyl-, N-β-cyanoethyl-, N-β-hydroxyethyl-, N-β-dimethylaminoethyl-, N-β-diethylaminoethyl-, N-β-methoxyethyl-, N-β-ethoxyethyl- and N,2-trimethylene-naptholactam-(1,8); derivatives of these naphtholactams, which are substituted in the naphthalene nucleus, such as N-methyl-4-chloro-, N-methyl-4-bromo-, N-ethyl-4-chloro-, N-ethyl-4-bromo-, 4-chloro (and -bromo)-N,2-trimethylene-, N-ethyl-2,4-dichloro- and -dibromo-, N-methyl-4-methoxy- and -ethoxy-, N-ethyl-4-methoxy- and -ethoxy, N-methyl- and N-ethyl-4-acetyl-, N-methyl- and N-ethyl-4-amino-, N-methyl- and N-ethyl-4-acetylamino-, N-methyl- and N-ethyl-4-dimethylamino-, 2-ethyl-, 2-isopropyl-, N-methyl-2-ethyl- and N-methyl-2-isopropyl-naphtholactam-1,8; N-methyl-2-pyridone, N-ethyl-2-pyridone, N,6-dimethyl-2-pyridone, N,4-dimethyl-2-pyridone, N-methyl-4-chloro-2-pyridone, N-methyl-4-methoxy-2-pyridone, N-methyl-4-phenyl-2-pyridone, N-methyl-4-benzyl-2-pyridone, N-methyl-6-benzyl-2-pyridone, -pyridone, N-methyl-4-acetyl-2-pyridone, N-methyl-4-benzoyl-2-pyridone, N-benzyl-2-pyridone and N-phenyl-2-pyridone; 2-quinolone, N-methyl-, N-ethyl- and N-benzyl-2-quinolone, N-methyl-5-chloro-, N-methyl-5-bromo-, N-methyl-5-methoxy-, N-methyl-5-ethoxy-, N-methyl-5-methyl-, N-methyl-6-chloro-, N-methyl-6-methoxy-, N-methyl- 6-methyl-, N-methyl-8-methoxy- and N-methyl-8-bromo-2-quinolone; the isomeric benzoquinolones and their N-methyl and N-ethyl derivatives; iso-quinolone-(1), N-methyl-, N-ethyl-, N-benzyl- and N-phenyl-isoquinolone-(1), 6-methoxy- (and -ethoxy)-isoquinolone-(1), 6-methyl( and 8-methyl)-isoquinolone-(1) and the isomeric benzo-isoquinolones-(1); 9-phenanthridone, N-methyl-, N-ethyl-, 3-bromo-, 3-chloro-, 3-acetylamino-, 3-dimethylamino-, 3-methoxy-, N-methyl-3-bromo- and N-ethyl-3-bromo-9-phenanthridone; 1,3-dimethyl-quinazoline-dione-(2,4), quinoxaline-dione-(2,3), N-methyl- and N-ethyl-quinoxaline-dione-(2,3), 1,4-dimethyl- and 1,4-diethyl-quinoxaline-dione-(2,3); 2,2-dimethyl-quinoxaline-(3), 2,2-dimethyl-benzo(e)-1,3-oxazinone-(4) [formula (IV)]; 2,2-dimethyl-benzo(e)-1,4-oxazinone-(3) [formula (V)] and its 7-nitro-, 5,6,8-trichloro- and 6,7-benzo derivatives:

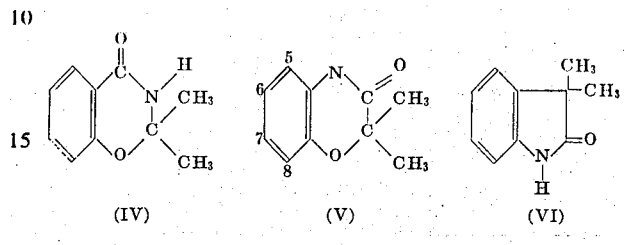

2,3-dimethyl-indolone-(2) [formula (VI)], 1,3,3-trimethyl-, 1-ethyl-3,3-dimethyl-, 1-phenyl-3,3-dimethyl-, 1-benzyl-3,3-dimethyl-, 1,3,3-trimethyl-5-chloro-, -5-bromo-, -5-methoxy-, -5-ethoxy- and -5-methoxycarbonyl-indolone-(2); 1-ethyl-4,5-benzo- and 1-methyl-6,7-benzo-indolone-(2); the compounds of the formulae (VII) to (XVI)

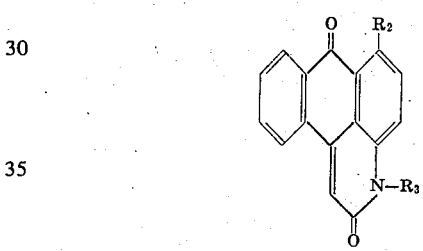

| | | |
|---|---|---|
| (VII): | $R_2 = R_3 =$ hydrogen | |
| (VIII): | $R_2 =$ hydrogen, | $R_3 =$ methyl |
| (IX): | $R_2 =$ hydrogen, | $R_3 =$ ethyl |
| (X): | $R_2 =$ chlorine, | $R_3 =$ hydrogen |
| (XI): | $R_2 =$ chlorine, | $R_3 =$ methyl |
| (XII): | $R_2 =$ chlorine, | $R_3 =$ ethyl |
| (XIII): | $R_2 =$ bromine, | $R_3 =$ hydrogen |
| (XV): | $R_2 =$ bromine, | $R_3 =$ ethyl |
| (XIV): | $R_2 =$ bromine, | $R_3 =$ methyl |
| (XVI): | $R_2 =$ methyl, | $R_3 =$ hydrogen; | the compounds of the formulas (XVII) to (XXIII)

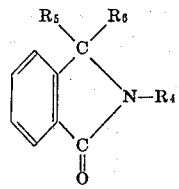

| | | |
|---|---|---|
| (XVII): | $R_4 = R_5 = R_6 =$ hydrogen | |
| (XVIII): | $R_4 =$ methyl, | $R_5 = R_6 =$ hydrogen |
| (XIX): | $R_4 =$ ethyl, | $R_5 = R_6 =$ hydrogen |
| (XX): | $R_4 =$ n-butyl, | $R_5 = R_6 =$ hydrogen |
| (XXI): | $R_4 =$ iso-butyl, | $R_5 = R_6 =$ hydrogen |
| (XXII): | $R_4 =$ hydrogen, | $R_5 = R_6 =$ methyl |
| (XXIII): | $R_4 = R_5 = R_6 =$ methyl; | |

1,3-dimethyl-benzimidazolone-(2), 1-methyl-3-ethyl-benzimidazolone, 1,3-diethyl-benzimidazolone, 1-benzyl-3-methylbenzimidazolone, 1-phenyl-3-methyl-benzimidazolone, 1,3,5-trimethyl-, 1,3-dimethyl-5-methoxy-, 1,3-dimethyl-6-methoxy-, 1,3-dimethyl-5,6-dimethoxy-, 1,3-dimethyl-5-chloro-, 1,3-dimethyl-5-bromo-, 1,3-dimethyl-5,6-dibromo- and the isomeric naphthimidazolones-(2); permidone, 1-methyl-perimidone, pyrimidone-(2), 1-methyl-pyrimidone-(2) and 5-phenylpyrimidone-(2), benzothiazolone-(2) and N-methyl-benzothiazolone-(2).

Suitable compounds of the formula (III) are, for example, phenoxazine, N-methyl-, N-ethyl-, N-β-cyanoethyl-, N-β-hydroxyethyl-, N-n-propyl, N-n-butyl-, N-iso-butyl-, N-iso-amyl-, N-n-hexyl-, N-benzyl-, N,4'-methylbenzyl, N-4'-chlorobenzyl, N-4'-methoxy-(ethoxy)-benzyl-, N-phenyl- and N-4'-nitrophenyl-phenoxazine and nuclear substitution products, such as 1-ethyl-, 1,9-diethyl-, 1-isopropyl-, 1-nitro-, 1-nitro-3-chloro-, 3-methoxy-, 3-ethoxy-, 3-methyl-, 3-acetylamino-, 3-dimethylamino-, 2-methoxycarbonyl-, N-methyl-3-chloro(or -bromo)-, N-methyl-3-methoxy(or -ethoxy)-, N-methyl-3-acetyl-, N-methyl-3,6-dichloro-, N-methyl-2,8-dibromo-, N-methyl-2,4-dichloro-, N-ethyl-3-acetyl-, N-ethyl-3-cyano-, N-methyl-1-fluoro- and N-methyl-3-acetylaminophenoxazine.

Suitable condensation agents, are, for example, acid chlorides, such as phosphorus oxychloride, phosphorus trichloride, phosphorus oxybromide, phosphorus tribromide, thionyl chloride and phosgene, Friedel-Crafts catalysts, such as tin(IV) chloride and titanium (IV) chloride, as well as mixtures of these compounds with one another and/or with aluminum chloride, zinc chloride, iron(III) chloride and/or phosphorus pentoxide.

Preferred dyestuffs are those of the formulae

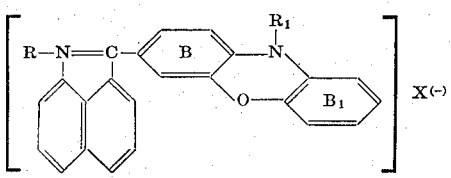

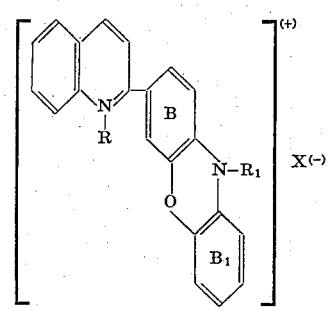

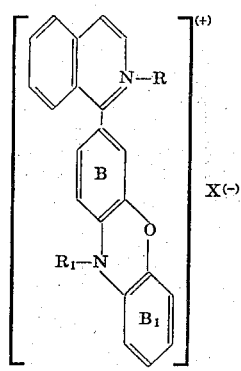

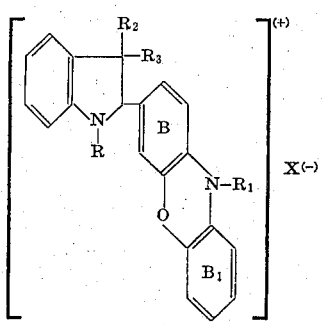

in which R, $R_1$ and X have the same meaning as above and $R_2$ and $R_3$ stand for lower alkyl radicals and in which the radicals R and $R_1$, the rings B and $B_1$ as well as the naphthalene ring or the quinoline, isoquinoline and indolenine system may contain further non-ionic substituents.

To carry out the process, a compound of the formula (II) is heated with the equivalent amount of a compound of the formula (III) and one of the condensation agents mentioned above, preferably with phosphorus oxychloride, to 40° to 150° C, preferably 50° to 105° C (boiling point of the phosphorus oxychloride). It is also possible to use deficient or excess amounts of the compound (III). Furthermore, it is frequently of advantage to add an inert diluent, such as methylene chloride, chloroform, carbon tetrachloride, benzene, toluene, chlorobenzene, dichlorobenzene, nitrobenzene, cyclohexane, methyl-cyclohexane or paraffin oil. In many cases, an excess of phosphorus oxychloride can, at the same time, serve as diluent. The dyestuffs of the formula (I) thus formed are isolated in the usual manner, for example, by filtering off with suction and washing with benzene or by removing the diluent by steam distillation and subsequently salting out the resulting aqueous dyestuff solution.

Dyestuffs of the formula (I) in which R stands for hydrogen, can be converted, by treatment with acid-binding agents, such as sodium hydroxide, potassium hydroxide, sodium carbonate, potassium carbonate, milk of lime, ammonia and organic amines, into the dyestuff bases of the formula (XXIV) from which they are derived.

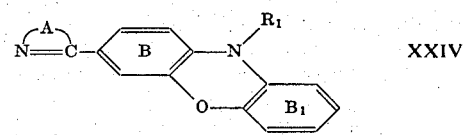

XXIV

In the formula (XXIV), A and $R_1$ have the same meaning as above; A and $R_1$ as well as the rings B and $B_1$ and any rings anellated to the ring containing A may carry non-ionic substituents.

Dyestuffs of the formula (I), in which $R_1$ stands for hydrogen and R for an alkyl, aralkyl, cycloalkyl or aryl radical, can be converted, by treatment with acid-binding agents, such as sodium hydroxide, potassium hydroxide, sodium carbonate, potassium carbonate, milk of lime, ammonia and organic amines, into the dyestuff bases of the formula (XXV) from which they are derived.

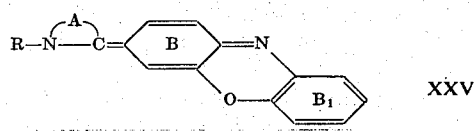

XXV

In the formula (XXV), A has the same meaning as above and R stands for an alkyl, aralkyl, cycloalkyl or aryl radical; A and R as well as the rings B and $B_1$ and any rings anellated to the ring containing A may carry non-ionic substituents.

These dyestuff bases (XXIV) and (XXV) can be converted into dyestuffs of the formula (I) by treatment with quaternizing agents, for example, with dimethyl sulphate, diethyl sulphate, methyl iodide, bromide, chloride, ethyl iodide, allyl bromide, benzene (or p-toluene)-sulphonic acid methyl (or ethyl) ester, chloro (or bromo)-acetic acid methyl (or ethyl) ester, benzyl chloride, β-chloropropionitrile or ethylenechlorohydrin.

In general, the type of the anion X contained in the dyestuffs (I) is unimportant for their dyeing properties and it is determined by the process of production and by the purification of the crude dyestuff which may have been carried out. In general, the dyestuffs are present as halides, especially chlorides or bromides, or as methosulphates, ethosulphates, sulphates, benzene- or toluene-sulphonates or acetates. These anions may be exchanged in any way for other anions, such as tetrafluoroborate, phosphate, chlorozincate, nitrate, perchlorate, oxalate, propionate, formate, citrate, maleinate, malate, tartrate, lactate or benzoate ions.

The dyestuffs which can be obtained according to the invention are new. They are suitable for the dyeing, printing and bulk-dyeing of synthetic and semi-synthetic materials, for example, polyamides, acetate rayon and acid-modified aromatic polyesters, of leather, coco fibers, paper and jute, for the production of inks and pastes for ball point pens, for the use in offset printing, but primarily for the dyeing, printing and bulk-dyeing (mass-dyeing) of materials which completely or predominantly consist of polymerized acrylonitrile and/or vinylidene cyanide. The dyeings and prints on the last-mentioned materials are characterized by outstanding fastness properties, especially fastness to light, wet processing, cross-dyeing, decatizing, sublimation, exhaust fumes and rubbing. The dyestuffs are readily soluble, they yield deep dyeings, due to their high yield and very good drawing power, and they do not soil wool.

Dyestuffs of the formula (I) in which A stands for the residual members of a benzo-(c,d)-indole derivative, are particularly valuable for industrial purposes. In addition to their outstanding fastness properties, they are characterized by an unusual long-wave absorption and, therefore, enable green-blue to green dyeings of great depth of color to be produced, such as have hitherto not been obtainable with equivalent fastness properties. These dyeings also have a very good so-called "evening color", i.e., their shade does not appear to be changed in an undesirable manner in artificial light.

The parts given in the following Examples are parts by weight.

EXAMPLE 1

59 Parts N-methyl-phenoxazine and 51 parts naphtholactam-(1,8) are heated in 500 to 750 parts chlorobenzene with 50 to 100 parts phosphorus oxychloride at 80 to 90° C for 24 hours. After cooling, the precipitated crystalline dyestuff of the formula

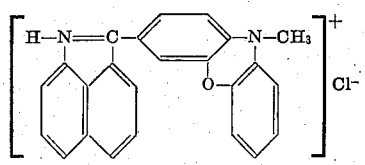

is filtered off with suction and washed with benzene. 95 Parts are obtained; a further fraction can be obtained by working up the filtrate. For conversion into the dyestuff base, the dyestuff salt obtained is stirred with an excess of a strongly diluted sodium carbonate solution at about 60° C for a short time. The resultant base is filtered off with suction, washed with water and dried over potassium hydroxide. It corresponds to the formula

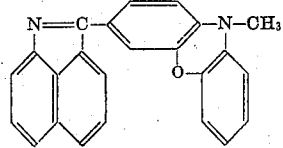

and melts at 175° to 178° C after recrystallization from toluene wherein it dissolves with a red color.

21 Parts of this dyestuff base are dissolved in 1,000 to 2,000 parts toluene; 8 to 12 parts of acid-free dimethyl sulphate are poured into this solution at 90° to 100° C. The mixture is then heated at boiling temperature for one-half to 1 hour, allowed to cool, the precipitated dyestuff of the formula

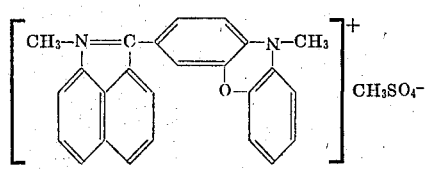

is filtered off with suction and washed with toluene or benzene. The yield is almost quantitative.

The toluene can be replaced with another solvent which is inert towards dimethyl sulphate, such as chlorobenzene or 1,2-dichlorobenzene.

The dyestuff so obtained yields very strongly greenish blue dyeings and prints of outstanding fastness properties on materials consisting completely or predominantly of polyacrylonitrile and/or vinylidene cyanide.

A very similar dyestuff is obtained when the dimethyl sulphate is replaced with the equivalent amount of diethyl sulphate. The N-methyl-phenoxazine was prepared according to the process described by Müller, Buu-Hoï and Rips, J. Org. Chem. 24, page 37.

EXAMPLE 2

19.7 Parts N-ethyl-naphtholactam-(1,8) and 19.7 parts N-methyl-phenoxazine are stirred with 100 parts phosphorus oxychloride at 70° –90° C for 10 to 20 hours. After this period of time, the excess phosphorus oxychloride is decomposed by pouring the reaction mixture into water, and the precipitation of the resultant dyestuff of the formula

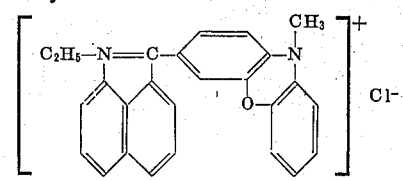

is completeed by the addition of sodium chloride. The dyestuff can be recrystallized from water and is identical, in respect of its dyeing properties, with the dyestuff obtained according to Example 1 with the use of diethyl sulphate.

If the N-ethyl-naphtholactam is replaced with the equivalent amount of N-methyl-, N-n-propyl-, N-isopropyl-, N-n-butyl-, N-iso-amyl- or N,2-trimethylene-naphtholactam-(1,8); then the otherwise unchanged method yields valuable, very strongly greenish blue dyestuffs.

EXAMPLE 3

19.7 Parts N-methyl-phenoxazine and 27.6 parts 4-bromo-N-ethyl-naphtholactam-(1,8) are heated to 90° – 100° C for about 20 hours together with 100 parts of chlorobenzene and 25 – 50 parts of phosphorus oxychloride. After cooling the precipitated crystalline dyestuff is filtered off with suction, washed with benzene or toluene and then recrystallized from water. The crystallizate contains a blue dyestuff which is formed as a by-product and which is separated off by washing with water. There is obtained a dyestuff of the formula

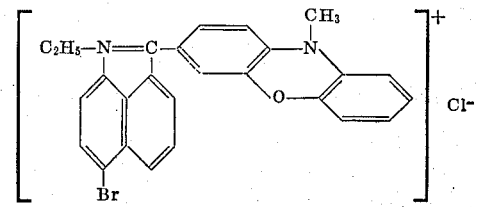

which dyes materials of polyacrylonitrile in green shades of very good fastness properties. Similar valuable green dyestuffs are obtained when using, instead of 4-bromo-N-ethyl-naphtholactam, an equivalent quantity of 4-chloro-N-ethyl-naphtholactam-(1,8), 4-chloro-N-n-propylnaphtholactam-(1,8) or 4-bromo-N-n-propyl-naphtholactam-(1,8). Some species of dyestuffs within the present invention are as follows

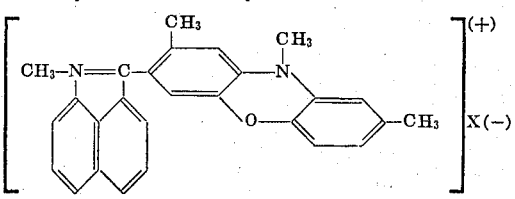

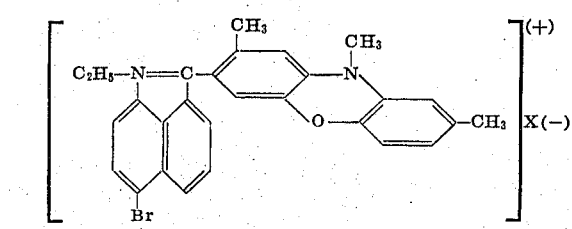

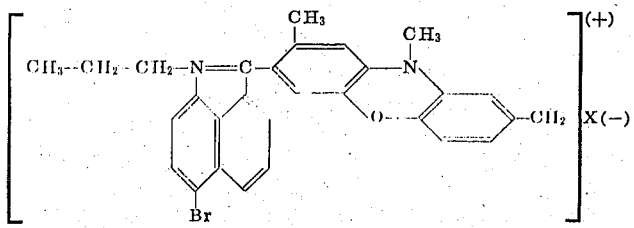

and the subgenus

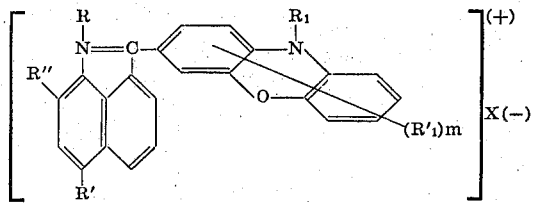

in which R is hydrogen, alkyl with 1—6 carbon atoms; alkyl with 1—6 carbon atoms substituted with diethylamino, dimethylamino, ethoxycarbonyl, methoxycarbonyl, chloro, bromo, cyano, hydroxy, methoxy, or ethoxy; phenyl; phenyl substituted with methyl, methoxy, or ethoxy; phenyl lower alkyl; phenyl lower alkyl substituted with methyl, methoxy or chloro; or cyclohexyl; R' is hydrogen or a nonionic substituent selected from the group consisting of chloro, bromo, methoxy, ethoxy, acetyl, amino, acetylamino or dimethylamino; R'' is hydrogen or a nonionic substituent selected from the group consisting of chloro, bromo, ethyl or propyl; and wherein R and R'' may together by trimethylene; $R_1$ is hydrogen or a substituent selected from the group consisting of alkyl with 1—6 carbon atoms; ethyl substituted with cyano or hydroxy; phenyl; nitro-phenyl; benzyl; benzyl substituted with methyl, chloro, methoxy or ethoxy; $R'_1$ is methyl, ethyl, propyl, fluoro, chloro, bromo, nitro, cyano, methoxy, ethoxy, acetyl, acetylamino, dimethylamino, or methoxycarbonyl;

m is a number from 0-2; and

X represents an anion.

EXAMPLE 4

When carrying out the process described in Example 3, using, however, the starting products given in the Table below, new dyestuffs of very good fastness properties are likewise obtained.

| Starting product II | Starting product III | Shade |
| --- | --- | --- |
| N-methyl-4-methoxy-naphtholactam-(1,8) | N-methyl-phenoxazine | blue green |
| N-methyl-4-ethoxy-naphtholactam-(1,8) | N-methyl-phenoxazine | blue green |
| N-ethyl-4-acetamino-naphtholactam-(1,8) | N-methyl-phenoxazine | green |
| N-ethyl-4-dimethylamino-naphtholactam-(1,8) | N-methyl-phenoxazine | green |
| N-methyl-4-methyl-naphtholactam-(1,8) | N-methyl-phenoxazine | strong greenish blue |
| 2-ethyl-naphtholactam-(1,8) | N-methyl-phenoxazine | strong greenish blue |
| 2-ethyl-N-methyl-naphtholactam-(1,8) | N-methyl-phenoxazine | greenish blue |
| N-ethyl-naphtholactam-(1,8) | N-ethyl-phenoxazine | very strong greenish blue |
| N-ethyl-naphtholactam-(1,8) | N-β-cyanoethyl-phenoxazine | greenish blue |
| N-methyl-naphtholactam-(1,8) | N-methyl-3-chloro-phenoxazine | greenish blue |
| N-methyl-quinolone-(2) | N-methyl-phenoxazine | violet |
| N-methyl-6-methoxy-quinolone-(2) | N-methyl-phenoxazine | violet |
| N-methyl-6-chloro-quinolone-(2) | N-methyl-phenoxazine | violet |

EXAMPLE 5

82 Parts N-methyl-benzthiazolone-(2) and 110 parts N-methyl-phenoxazine are heated to about 90° C for 6 to 8 hours together with 150 to 200 parts phosphorus oxychloride. After cooling the mixture is stirred with 5,000 parts of water. The reaction mixture is filtered off with suction at about 30° C; the residue is recrystallized from 700 to 1,000 parts of water with the addition of charcoal. The precipitation of the dyestuff of the formula

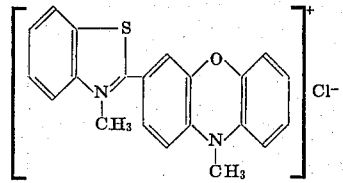

is completed by adding dropwise 100 ml of a saturated NaCl solution. The dyestuff yields red orange dyeings and prints on materials of polyacrylonitrile and acetate rayon.

When carrying out the afore-described process using, however, an equivalent amount of 1,3,3-trimethyl-indolone-(2) instead of benzthiazolone, there is obtained the red dyestuff of the formula

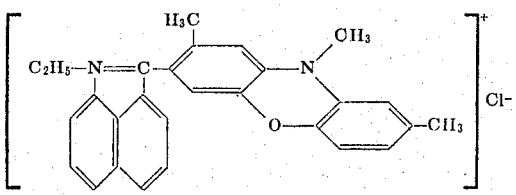

The dyes and prints obtained with the red dyestuff on materials of polyacrylonitrile are distinguished by very good fastness properties.

EXAMPLE 6

60 Parts 2,8,10-trimethyl-phenoxazine and 54 parts N-ethyl-naphtholactam-(1,8) are heated with 20 to 40 parts 1,2-dichlorobenzene and 10 to 20 parts phosphorus oxychloride to about 90° C for 20 hours. After cooling the dichlorobenzene is driven off with steam and the remaining aqueous solution is treated with sodium chloride until the resulting dyestuff is completely precipitated. The resinous crude product thus obtained is purified by recrystallization from water with the addition of charcoal. There is obtained a dyestuff of the formula which dyes materials of polyacrylonitrile in very strong greenish blue shades of very good fastness properties.

The 2,8,10-trimethyl-phenoxazine used in the above process was prepared as follows:

635 Parts 2,8-dimethyl-phenoxazine and 4,500 parts methanol were heated to 280° to 290° C for 5 hours with the addition of 15 parts of phosphorus trichloride. A pressure of about 155 atm. resulted. After cooling the solution was neutralized with a methanolic caustic potash solution. The methanol was distilled off, the oily residue washed with warm water, dried and distilled. The N-methyl-derivative boils at 182° C to 185° C and 1.3 mm Hg. Yield: 242 parts.

I claim:
1. Dyestuff of the formula

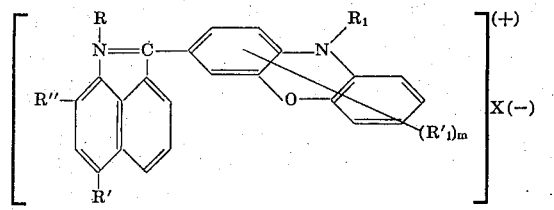

in which R is hydrogen, alkyl with 1–6 carbon atoms; alkyl with 1–6 carbon atoms substituted with diethylamino, dimethylamino, ethoxycarbonyl, methoxycarbonyl, chloro, bromo, cyano, hydroxy, methoxy, or ethoxy; phenyl; phenyl substituted with methyl, methoxy, or ethoxy; phenyl lower alkyl; phenyl lower alkyl substituted with methyl, methoxy or chloro; or cyclohexyl; R′ is hydrogen or a nonionic substituent selected from the group consisting of chloro, bromo, methoxy, ethoxy, acetyl, amino, acetylamino or dimethalamino; R″ is hydrogen or a nonionic substituent selected from the group consisting of chloro, bromo, ethyl or isopropyl; and wherein R and R″ may together be trimethylene; $R_1$ is hydrogen or a substituent selected from the group consisting of alkyl with 1–6 carbon atoms; ethyl substituted with cyano or hydroxy; phenyl; nitro-phenyl; benzyl; benzyl substituted with methyl, chloro, methoxy or ethoxy ; $R'_1$ is methyl, ethyl, isopropyl, fluoro, chloro, bromo, nitro, cyano, methoxy, ethoxy, acetyl, acetylamino, dimethylamino, or methoxycarbonyl;

m is a number from 0–2; and
X represents an anion.

2. A dyestuff of claim 1 of the formula

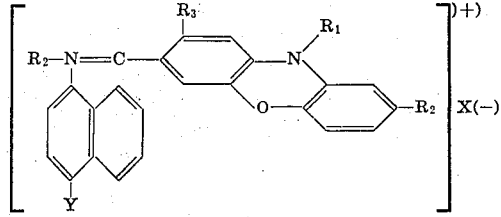

in which $R_1$ stands for a optionally substituted lower alkyl radical having one to three carbon atoms, $R_2$ denotes a lower alkyl radical having one to four carbon atoms, $R_3$ stands for hydrogen or a methyl group, $R_4$ represents hydrogen or a methyl group, Y denotes hydrogen, chlorine or bromine and X is an anion.

3. A dyestuff of claim 1 of the formula

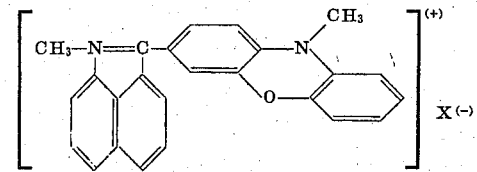

in which X is an anion.
4. A dyestuff of claim 1 of the formula

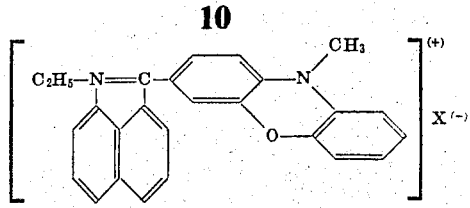

in which X is an anion.
5. A dyestuff of claim 1 of the formula

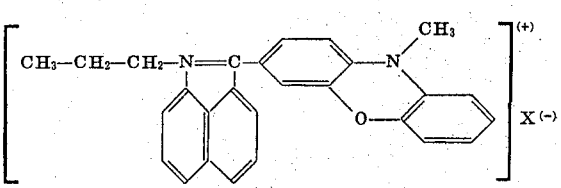

in which X is an anion.
6. A dyestuff of claim 1 of the formula

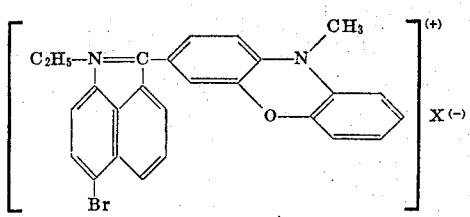

in which X is an anion.
7. A dyestuff of claim 1 of the formula

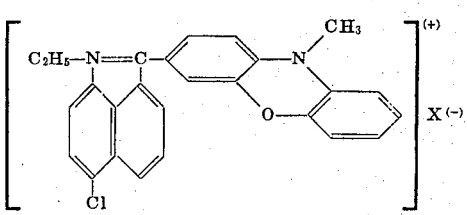

in which X is an anion.
8. A dyestuff of claim 1 of the formula

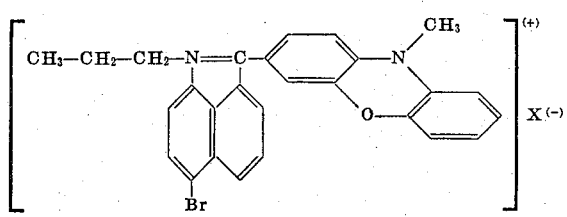

in which X is an anion.
9. A dyestuff of claim 1 of the formula

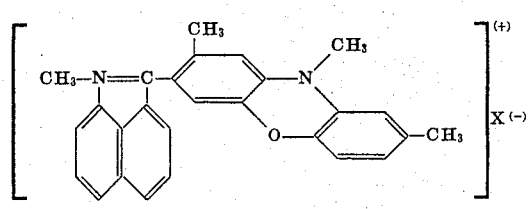

in which X is an anion.
10. A dyestuff of claim 1 of the formula

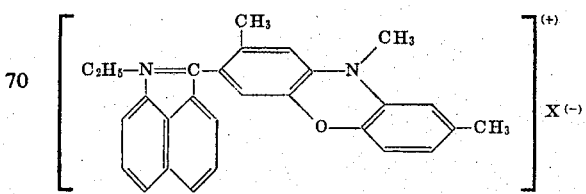

in which X is an anion.

11. A dyestuff of claim 1 of the formula
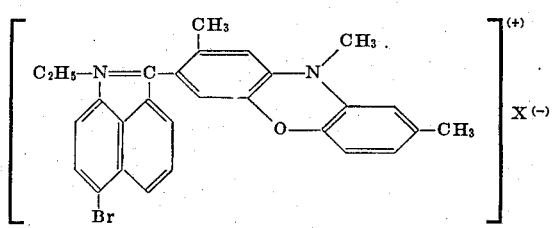
in which X is an anion.
12. A dyestuff of claim 1 of the formula
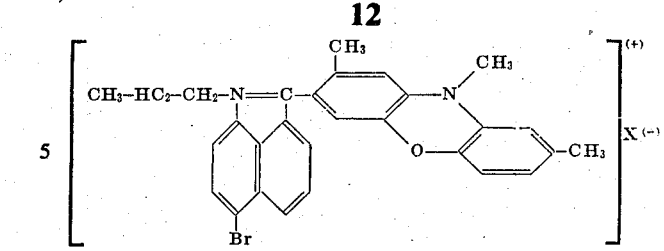
in which X is an anion.
* * * * *

UNITED STATES PATENT OFFICE
CERTIFICATE OF CORRECTION

Patent No. 3,673,182  Dated June 27, 1972

Inventor(s) Alfred Brack

It is certified that error appears in the above-identified patent and that said Letters Patent are hereby corrected as shown below:

| COLUMN | LINE | ERROR |
|---|---|---|
| 1 | 43 | "-n-" should read -$\beta$- |
| 2 | 21 | "2,3" should read --3,3--. |
| 7 | 2nd formula | "-$CH_2$" should read --$CH_3$--. |
| 8 | 10 2nd Column of table | the word "phenoxazine" is missing |
| 9 | 33 | "dimethalamino" should read --dimethylamino--. |
| 12 | Claim 12 in the formula | "-$HC_2$-" should read --- -$CH_2$---. |

Signed and sealed this 3rd day of December 1974.

(SEAL)
Attest:

McCOY M. GIBSON JR.
Attesting Officer

C. MARSHALL DANN
Commissioner of Patents